(12) United States Patent
Döpfert et al.

(10) Patent No.: US 12,169,017 B2
(45) Date of Patent: Dec. 17, 2024

(54) VEHICLE TRANSMISSION WITH A POWER TAKE-OFF, VEHICLE AND WORKING MACHINE ARRANGEMENT

(71) Applicant: ZF Friedrichshafen AG, Friedrichshafen (DE)

(72) Inventors: Julius Döpfert, Tettnang (DE); Sascha Fiesel, Friedrichshafen (DE); Horst Leichsenring, Friedrichshafen (DE); Frank Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/466,326

(22) Filed: Sep. 13, 2023

(65) Prior Publication Data
US 2024/0102549 A1    Mar. 28, 2024

(30) Foreign Application Priority Data
Sep. 16, 2022  (DE) ...................... 10 2022 209 747.5

(51) Int. Cl.
*F16H 57/04*    (2010.01)
*B60K 17/28*    (2006.01)

(52) U.S. Cl.
CPC ......... *F16H 57/0435* (2013.01); *B60K 17/28* (2013.01); *F16H 57/0424* (2013.01); *F16H 57/0436* (2013.01); *F16H 57/045* (2013.01)

(58) Field of Classification Search
CPC . F16H 57/0435; F16H 57/0424; F16H 57/045
See application file for complete search history.

(56) References Cited

U.S. PATENT DOCUMENTS 3,540,297 A * 11/1970 Wagner .................. B60K 17/28
                                                    74/15.86
5,228,355 A *  7/1993 Smith ................. F16H 57/0493
                                                    184/6.12
(Continued)

FOREIGN PATENT DOCUMENTS

CN     210371947 U      4/2020
CN     215293531 U     12/2021
(Continued)

OTHER PUBLICATIONS

Sun Hydraulics Product Catalog, 3-Way Flow Control Valve, Fixed Orifice, Model FRBA, snhy.com/FRBA, 2019.
(Continued)

*Primary Examiner* — Michael A Riegelman
(74) *Attorney, Agent, or Firm* — Finch & Maloney PLLC

(57) ABSTRACT

A vehicle transmission has at least one lubrication point, a power take-off, a lubricant tapping point for a power take-off module, and a lubrication system for supplying the lubrication point(s) and the lubricant tapping point with lubricant. The lubrication system includes a lubricant reservoir, a main line section emerging from the lubricant reservoir, a first supply line section leading to the lubrication point(s), a second supply line section leading to the lubricant tapping point, and a return line section leading to the lubricant reservoir. A valve has a first valve port associated with the main line section, a second valve port associated with the lubricant tapping point, a third valve port associated with the return line section, and a bypass duct that acts between the first valve port and the second valve port. A vehicle with such a vehicle transmission and a working machine arrangement are also disclosed.

9 Claims, 3 Drawing Sheets

(56) References Cited

U.S. PATENT DOCUMENTS

| | | | |
|---|---|---|---|
| 7,765,884 B2* | 8/2010 | Frait | B60K 17/28 |
| | | | 74/15.84 |
| 8,408,363 B2* | 4/2013 | Richard | B60K 17/28 |
| | | | 184/35 |
| 10,443,703 B2* | 10/2019 | Tokozakura | F16H 57/0475 |
| 2010/0218642 A1* | 9/2010 | Leichsenring | F16H 57/0413 |
| | | | 74/606 A |
| 2013/0228411 A1* | 9/2013 | Wesley | F16D 25/123 |
| | | | 192/85.61 |
| 2017/0241538 A1* | 8/2017 | Tokozakura | F16H 57/0434 |
| 2018/0274662 A1* | 9/2018 | Spangler | F16H 57/0473 |
| 2019/0093677 A1* | 3/2019 | Ohgata | F15B 11/17 |
| 2019/0359054 A1* | 11/2019 | Petersen | B60K 25/06 |
| 2021/0140359 A1* | 5/2021 | Bonte | F16H 57/0442 |
| 2021/0270361 A1* | 9/2021 | Maurer | F16N 23/00 |
| 2022/0074484 A1* | 3/2022 | Reid | B60K 17/22 |
| 2022/0268354 A1* | 8/2022 | Fiesel | F16H 57/0435 |
| 2023/0417259 A1* | 12/2023 | Haberstock | F16H 61/0031 |
| 2024/0102549 A1* | 3/2024 | Dopfert et al. | B60K 17/28 |

FOREIGN PATENT DOCUMENTS

| | | |
|---|---|---|
| DE | 10 2015 220 888 A1 | 4/2017 |
| JP | H08-135836 A | 5/1996 |
| WO | 2007/108805 A1 | 9/2007 |
| WO | 2014/030528 A1 | 2/2014 |
| WO | 2020/059786 A1 | 3/2020 |

OTHER PUBLICATIONS

German Patent Office, German Search Report issued in German patent application No. 10 2022 209 747.5 (Apr. 17, 2023).

United States Patent Office, Office Action issued in U.S. Appl. No. 17/667,772 (Jan. 18, 2024).

* cited by examiner

VEHICLE TRANSMISSION WITH A POWER TAKE-OFF, VEHICLE AND WORKING MACHINE ARRANGEMENT

RELATED APPLICATIONS

This application claims the benefit of and right of priority under 35 U.S.C. § 119 to German Patent Application no. 10 2022 209 747.5, filed on 16 Sep. 2022, the contents of which are incorporated herein by reference in its entirety.

FIELD OF THE DISCLOSURE

The invention relates to a vehicle transmission with at least one lubrication point, a power take-off, a lubricant tapping point for a power take-off module connected to the power take-off, and a lubrication system for supplying the at least one lubrication point and the lubricant tapping point with lubricant, the said lubrication system comprising a lubricant reservoir, a main line section emerging from the lubricant reservoir, a first supply line section leading to the at least one lubrication point, a second supply line section leading to the lubricant tapping point, and a return line section leading back into the lubricant reservoir. In addition, the invention relates to a vehicle. Furthermore, the invention relates to a working machine arrangement.

BACKGROUND

From DE 10 2021 201 286 A1 a vehicle transmission is known, which comprises a lubrication system and a connection for connecting a power take-off module to the vehicle transmission. The lubrication system is designed to lubricate the vehicle transmission and to lubricate the power take-off module when the power take-off module is arranged on the vehicle transmission. The lubrication system has a pressure supply line and a lubricant line fed with lubricant from the pressure supply line. The lubricant line leads by way of a first section to at least one lubrication point of the vehicle transmission and by way of a second section to a lubricant tapping point of the vehicle transmission for the power take-off module. In the second section are arranged a throttle and a first valve connected parallel to the throttle, in particular a first non-return valve. The said first valve is designed to open in the direction of the lubricant tapping point if the lubricant pressure increases to a first pressure level.

SUMMARY

The purpose of the present invention is to improve, structurally and/or functionally, a vehicle transmission as mentioned to begin with. In addition, a purpose of the invention is to improve, structurally and/or functionally, a working machine arrangement as mentioned to begin with.

This objective is achieved with a vehicle transmission having the features disclosed herein. In addition, the objective is achieved with a vehicle having the features disclosed herein. Furthermore, the objective is achieved with a working machine having the features disclosed herein. Advantageous embodiments and/or further developments will be apparent in light of the present disclosure.

The vehicle transmission can be designed to be arranged in a drivetrain of a vehicle. The vehicle transmission can be designed to be arranged between a drive machine, in particular an internal combustion engine, and at least one drivable vehicle wheel. The vehicle transmission can be in the form of a manual change-speed transmission. The vehicle transmission can comprise an input, a main output, and a secondary output. The main output can also be called the main drive output. The secondary output can also be called the power take-off. The vehicle transmission can have a transmission housing. The transmission housing can delimit an inside space of the transmission.

The at least one lubrication point can be arranged in the inside space of the transmission. The at least one lubrication point can be a targeted point which is lubricated or to be lubricated. The power take-off can be called a PTO or a power take-off shaft. The power take-off can be designed as a mechanical drive-power source for a power take-off module. The power take-off can be in the form of a direct drive. The power take-off can comprise a profiled shaft or a profiled shaft stub. The power take-off can be in the form of an indirect drive. The power take-off can comprise a hydraulic pump, an angle drive or a belt drive. The power take-off can comprise a signal interface. When necessary, a power take-off module can be connected to the power take-off. In this context "connection" means in particular a mechanical power connection, but if appropriate also a signal connection.

The lubricant tapping point is designed to connect a power take-off module connected to the power take-off with the lubrication system. In this context "connect" relates in particular to a connection for the purpose of delivering lubricant. When no power take-off module is connected to the power take-off, the lubricant tapping point can be unused, capable of deactivation and/or deactivated. The lubricant can also be designed to cool and is then also called the coolant. The lubricant can be an oil, in particular a transmission oil. The lubrication system can be a circulatory system. The lubricant reservoir can be formed in the inside space of the transmission.

The main line section can lead from the lubricant reservoir to the first supply line section and/or it can be designed to enable a lubricant flow to pass from the lubricant reservoir to the first supply line section. The main line section can lead from the lubricant reservoir to the second supply line section and/or it can be designed to enable a lubricant flow to pass from the lubricant reservoir to the second supply line section. The main line section can at least in part be a single line and/or it may comprise functionally parallel lines. The first supply line section can lead from the main line section to the at least one lubrication point and/or it can be designed to enable a lubricant flow to pass from the main line section to the at least one lubrication point. The second supply line section can lead from the lubricant reservoir to the lubricant tapping point and/or it can be designed to enable a lubricant flow to pass from the main line section to the lubricant tapping point. The return line section can lead from the lubricant tapping point to the lubricant reservoir.

The lubrication system can comprise a lubricant pump. The lubricant pump can be arranged in the main line section. The lubricant pump can be controllable, in particular electronically controllable. The lubricant pump can be designed to generate a lubricant pressure. The lubricant pump can be designed to deliver a lubricant pressure that acts upon the first valve port.

The valve can be designed to control a flow of lubricant. The valve can be designed to control a flow of lubricant to and/or from the power take-off module. The valve can be designed to control a flow of lubricant to the lubricant reservoir. The valve can be designed to control a flow of lubricant into the second supply line section and/or to control a flow of lubricant into the return line section. The valve can be actuated by its own medium, in particular by the lubricant itself. The valve can be a non-return valve. The valve can be actuated mechanically. The valve can be a directional valve. The valve can be a 3/2-way valve. The valve can be a piston valve. The valve can be a switching valve. The valve can have a valve housing. The first valve port, the second valve port, and/or the third valve port can be arranged on the valve housing and/or formed with the help of the valve housing. The valve housing can be formed with the help of a control block. The valve housing can be formed by a transmission housing.

The valve can comprise a valve piston. The valve piston can have a front face at its end. The front face can be associated with the first valve port. The valve piston can have a shell surface section associated with the second valve port. The valve piston can have control edges. The first control edge can be designed for the optional blocking and release of a lubricant flow between the first valve port and the second valve port. The valve piston can have a second control edge. The second control edge can be designed for the optional blocking and release of a lubricant flow between the first valve port and the third valve port. The bypass duct can be arranged in the valve piston. The bypass duct can have an inlet opening, at least one bypass opening, and at least one outlet opening. The inlet opening can open into the flat face on the end. The inlet opening can open into the shell surface section of the valve piston associated with the second valve port. The outlet opening can open into a further shell surface section of the valve piston associated with the third valve port.

The bypass duct serves in particular to produce a bypass flow between the first valve port and the second valve port, which flow takes place regardless of any switching position of the valve. This bypass flow in particular provides a basic supply of lubricant for the power take-off module.

The valve can have a number of shift positions, in particular a first shift position, a second shift position, and a third shift position. In the first shift position, regardless of a bypass flow or the bypass flow, a lubricant flow between the first valve port and the second valve port can be blocked. In the first shift position, a lubricant flow between the first valve port and the third valve port can be blocked. In the second shift position, regardless of a bypass flow or the bypass flow, a lubricant flow between the first valve port and the second valve port can be made possible. In the second shift position, a lubricant flow between the first valve port and the third valve port can be blocked. In the third shift position, regardless of a bypass flow or the bypass flow, a lubricant flow between the first valve port and the second valve port can be made possible. In the third shift position a lubricant flow between the first valve port and the third valve port can be made possible.

The valve can be switched as a function of a pressure existing at the first valve port. Depending on a pressure existing at the first valve port the valve can be switched between the shift positions. Depending on a pressure existing at the first valve port the valve can be switched between the first shift position, the second shift position, and the third shift position.

The valve can be designed to switch to the first shift position when a pressure at the first valve port is lower than a predetermined first pressure value. The valve can be designed to switch to the second shift position when a pressure at the first valve port is higher than the predetermined first pressure value but lower than a predetermined second pressure value. The valve can be designed to switch to a third shift position when the pressure at the first valve port is higher than the predetermined second pressure value. The predetermined first pressure value can be between 1 bar and 1.5 bar, in particular between 1.20 bar and 1.26 bar, and in particular 1.23 bar. The predetermined second pressure value can be above the first predetermined value by at most 0.5 bar.

The vehicle can be a motor vehicle, in particular a truck, a utility vehicle, a towing machine, a tractor, a building machine, a fire-engine, a bus, a disaster prevention vehicle, and/or a municipal vehicle. The vehicle can comprise a drivetrain. The vehicle can comprise a drive machine. The drive machine can be in the form of an internal combustion engine and/or an electric machine. The vehicle can have at least one driven wheel. The vehicle can comprise an electronic control device.

The control device can also be called an Electronic Control Unit (ECU). The control device can be designed to control the vehicle, the drive machine, the vehicle transmission, the clutch for engaging the power take-off, the lubricant pump, and/or a power take-off module connected to the power take-off. The control device can comprise at least one processor, at least one working memory, at least one data memory, at least one signal input, and/or at least one signal output. The control device can supply signals and/or information about the vehicle, the drive machine, the vehicle transmission, the lubricant pump, and/or a power take-off module connected to the power take-off. The control device can be designed to control the lubricant pump having regard to signals and/or information about the vehicle, the drive machine, the vehicle transmission, and/or a power take-off module connected to the power take-off. The control device can be designed to increase an output of the lubricant pump when a power take-off module is or will be connected to the power take-off and/or when a power take-off module connected to the power take-off evinces a need for more lubrication. The control device can be designed to reduce the output of the lubricant pump when a power take-off module is or will be detached from the power take-off and/or when a power take-off module connected to the power take-off evinces a need for reduced lubrication.

The working machine arrangement can be formed when a power take-off module is connected to the power take-off. The working machine arrangement can be taken apart when no power take-off module is connected to the power take-off. The working machine arrangement can be formed and/or taken apart, as required. The power take-off module can be connected to the power take-off and/or disconnected from the power take-off, as required. In this context the terms "connect" and "disconnect" refer in particular to a power connection, but if appropriate also to a signal connection. The power take-off module can be a working machine, such as an agricultural or forestry working machine, a high-pressure pump, or a generator.

Thanks to the invention, wear of the vehicle transmission is reduced. Lubrication of the transmission is prioritized. A lubrication pressure can be controlled regardless of the lubrication of a power take-off module. A power take-off module arranged on the power take-off receives a basic supply of lubricant at all times. A power take-off module arranged on the power take-off is supplied with lubricant in an optimized manner adapted to the requirements. Construction precision can be increased. Leakage of lubricant when a power take-off module is being connected to the power take-off and/or when a power take-off module is being disconnected from the power take-off can be reduced or prevented.

BRIEF DESCRIPTION OF THE DRAWINGS

Below, example embodiments of the invention are described in greater detail with reference to figures, which show as examples and in a schematic manner.

DETAILED DESCRIPTION

Figure 1:
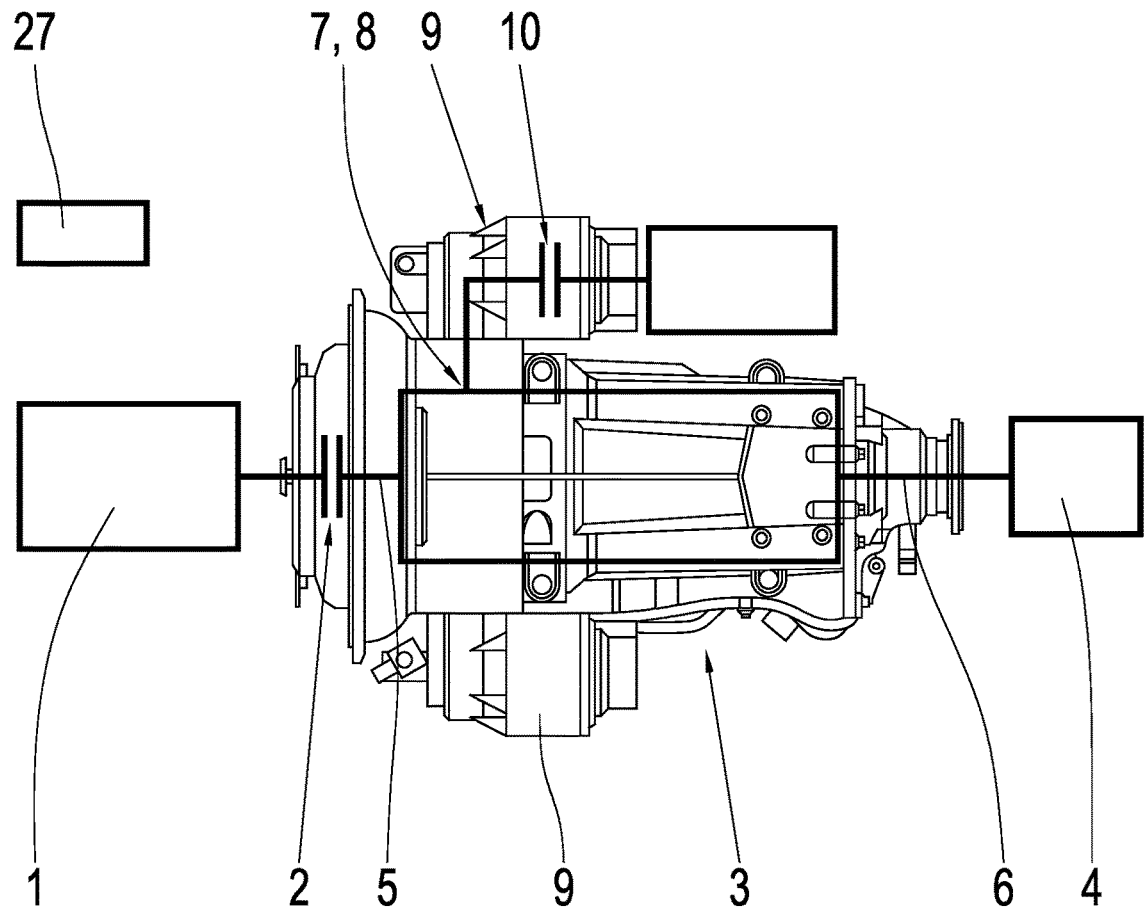
FIG. 1: A drivetrain of a motor vehicle with a vehicle transmission having a power take-off module.

FIG. 1 shows a section through a drivetrain of a motor vehicle, no more of which is shown here. The drivetrain comprises a drive machine 1, for example, in the form of an internal combustion engine, a starting clutch 2, a vehicle transmission 3, and further components 4 which are designed to transmit a drive power from the drive machine 1 to driven vehicle wheels.

The vehicle transmission 3 comprises an input shaft 5, an output shaft 6, lubrication points, a power take-off 7, a lubricant tapping point 8 for a power take-off module 9, a clutch 10 for connecting the power take-off module 9, and a lubrication system for supplying the lubrication points and the lubricant tapping point 8 with lubricant.

Figure 2:
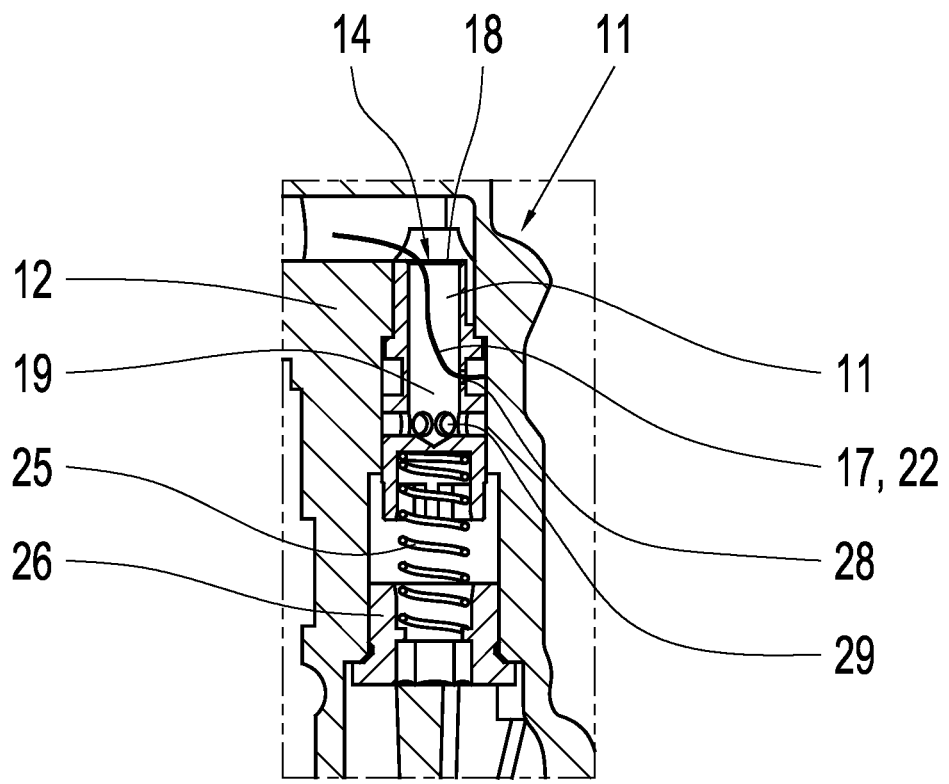
FIG. 2: A longitudinal section through a valve for controlling a lubricant flow to the power take-off module and to the lubricant reservoir, in a first shift position.
Figure 3:
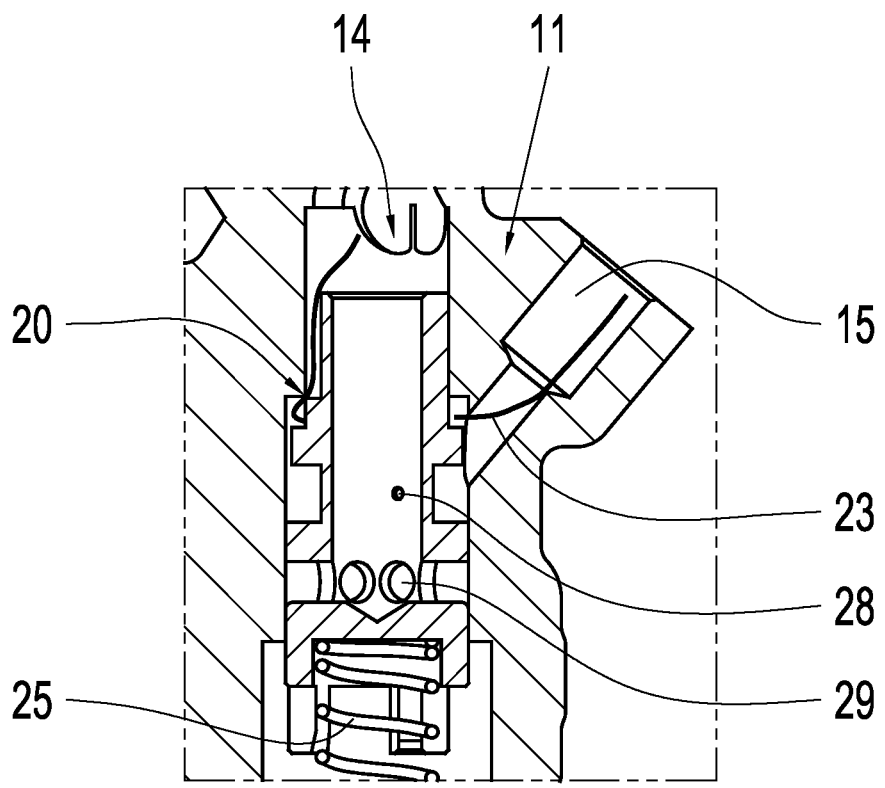
FIG. 3: A longitudinal section through a valve for controlling a lubricant flow to the power take-off module and to the lubricant reservoir, in a second shift position.
Figure 4:
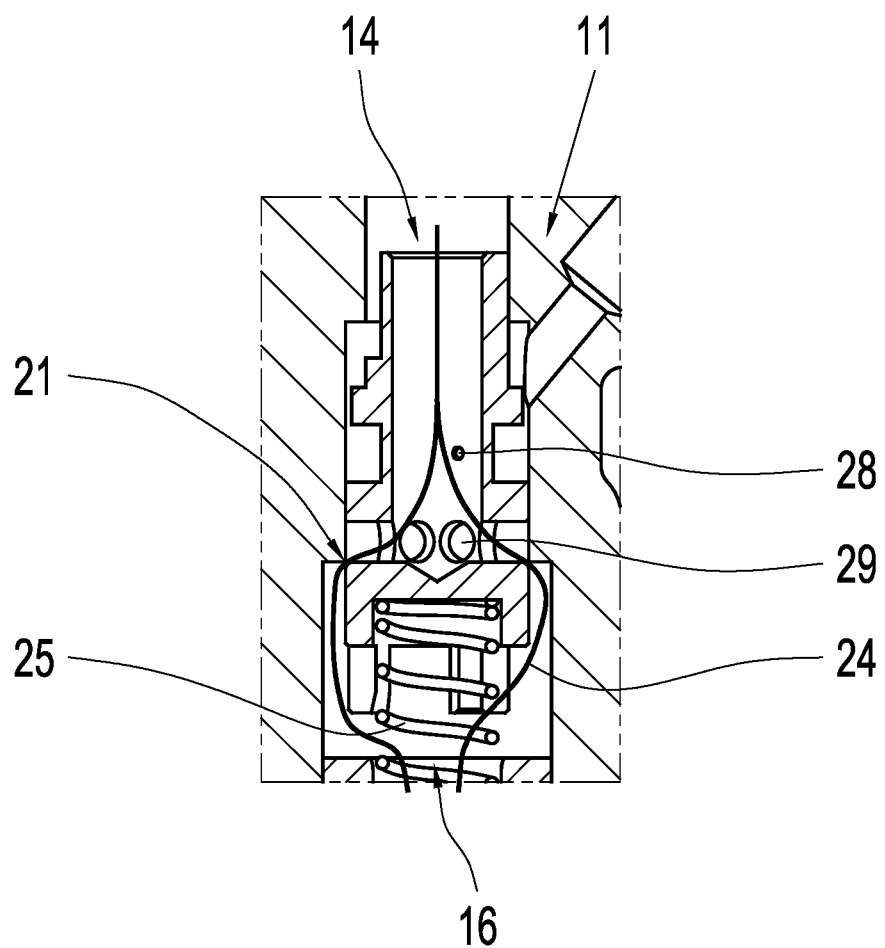
FIG. 4: A longitudinal section through a valve for controlling a lubricant flow to the power take-off module and to the lubricant reservoir, in a third shift position.

The lubrication system comprises a lubricant reservoir, a lubricant pump, a main line section emerging from the lubricant reservoir, a first supply line section leading to the lubrication points, a second supply line section leading to the lubricant tapping point 8, a return line section leading to the lubricant reservoir, and the valve 11 shown in greater detail in FIGS. 2 to 4, which is designed to control a lubricant flow by way of the lubricant tapping point 8 to the power take-off module 9 and to the lubricant reservoir.

The valve 11 is designed as a lubricant-actuated valve and comprises a valve housing 12, a valve piston 13, a first valve port 14 associated with the main line section, a second valve port 15 associated with the lubricant tapping point 8, a third valve port 16 associated with the return line section, and a bypass duct 17 that extends between the first valve port 14 and the second valve port 15. The second valve port 15 extends laterally out of the valve housing 12 (see FIG. 3). The second valve port 15 can at the same time be designed to be the lubricant tapping point 8. The valve housing 12 can be formed by the transmission housing of the vehicle transmission 3.

The valve piston 13 has a front face 18 at its end, which is associated with the first valve port 14, and a shell surface section 19 associated with the second valve port 15, a first control edge 20 for the optional blocking and releasing if a lubricant flow between the first valve port 14 and the second valve port 15, and a second control edge 21 for the optional blocking and releasing of a lubricant flow between the first valve port 14 and the third valve port 16. The bypass duct 17 is arranged in the valve piston 13 and has an inlet opening that opens onto the said end front face 18, and a bypass opening 28 arranged in the shell surface section 19 and opening into the second valve port 15. On a further shell surface section of the valve piston 13 the bypass duct 17 has at least one further opening 29, by way of which the bypass duct 17 can be connected with the third valve port 16. Thus, the said further opening 29 is associated with the third valve port 16.

The valve 11 has a first shift position, a second shift position, and a third shift position. FIG. 2 shows the valve 11 in its first shift position. FIG. 3 shows the valve in its second shift position. FIG. 4 shows the valve in its third shift position. By way of the bypass opening 28 the bypass duct 17 enables a lubricant flow 22 (bypass flow), which is independent of the shift position, for providing a basic supply of lubricant to the power take-off module 9. This basic supply is of a size only suitable for operating the power take-off module 9 under a basic load at the power take-off, or at any rate under low load.

In the first shift position, regardless of the bypass flow 22 through the bypass opening 28, a lubricant flow between the first valve port 14 and the second valve port 15 is blocked, and a lubricant flow between the first valve port 14 and the third valve port 16 is also blocked. Thus, in the said first shift position only the aforesaid basic supply of lubricant to the power take-off module 9 takes place by way of the bypass flow 22.

In the second shift position, regardless of the bypass flow 22, a lubricant flow 23 between the first valve port 14 and the second valve port 15 is enabled, and a lubricant flow between the first valve port 14 and the third valve port 16 is blocked. The lubricant flow 23 between the first valve port 14 and the second valve port 15 flows over the first control edge 20 raised away from the valve housing 12, passing laterally over the valve piston 13, to the second valve port 15. The lubricant flow 23 passing to the second valve port 15 in the second shift position is usually greater than the bypass flow 22. The lubricant flow 23 taking place in the second shift position and the bypass flow 22 are in particular of a size such that during the operation of the power take-off 7 under normal load and in particular also under full load, the power take-off module 9 is sufficiently well lubricated.

In the third shift position, regardless of the bypass flow 22, the said lubricant flow 23 between the first valve port 14 and the second valve port 15 is enabled, and in addition a lubricant flow 24 between the first valve port 14 and the third valve port 16 is also enabled. In this case the lubricant flow 23 flows identically to the second shift position case, passing the valve piston 13 laterally from the first valve port 14, over the first control edge 20 to the second valve port 15. In contrast, the lubricant flow 24 between the first valve port 14 and the third valve port 16 first flows via the bypass duct 17 to the opening 29, where it passes through the valve piston 13 outward; from there the lubricant flow 24 flows over the second control edge 21 raised away from the valve housing 12, laterally past the valve piston 13 and to the third valve port 16. Thereby, the pressure at the second valve port 15 is limited. For that purpose, the lubricant flow 24 is preferably diverted from the third valve port 16 via the return line section directly into the lubricant reservoir. Thus, the third shift position ensures that no unacceptably high lubricant pressure is delivered to the lubricant tapping point 8 and the power take-off module 9 connected thereto.

The valve 11 can be switched against the force of a restoring spring 25 by increasing the pressure applied at the first valve port 14, starting from the first shift position, through the second shift position to the third shift position. The restoring spring 25 is supported on one side against a stop 26 fixed to the valve housing and on the other side against the valve piston 13 and acts upon the valve piston 13 in the direction of the first shift position with a restoring force.

When a pressure at the first valve port 14 is lower than a pressure value in particular of around 1.23 bar, the valve 11 switches to the first shift position or remains in the first shift position. Thereby, the power take-off module 9 is supplied with a basic lubricant supply. When the pressure at the first valve port 14 exceeds the pressure value in particular of around 1.23 bar, the valve 11 switches to the second shift position. Thereby, the power take-off module 9 is supplied with an amount of lubricant sufficient for the operation of the power take-off module 9 under load. When the pressure at the first valve port 14 exceeds a pressure value in particular of around 1.23 bar plus a safety margin, the valve 11 switches to the third shift position. Then, the power take-off module 9 is further supplied via the second valve port 15 with enough lubricant for operation under load and at the same time, via the third valve port 16, an unacceptably high lubricant pressure is drained away.

The vehicle comprises an electronic control device 27 which controls the output of the lubricant pump, having regard to signals and/or information about the vehicle, the drive machine 1, the vehicle transmission 3, the clutch 10, the lubricant pump, and/or a power take-off module 9 connected to the power take-off 7. In this way the pressure at the first valve port 14 can be adjusted and the valve 11 appropriately controlled.

For further technical features of the present invention reference can be made to Patent Application DE 10 2021 201 286 A1, whose characteristics are also comprised in the technical principle of the present invention, and which is incorporated herein by reference in its entirety.

INDEXES

1 Drive machine
2 Starting clutch
3 Vehicle transmission
4 Further components
5 Input shaft
6 Output shaft
7 Power take-off
8 Lubricant tapping point
9 Power take-off module
10 Clutch
11 Valve
12 Valve housing
13 Valve piston
14 First valve port
15 Second valve port
16 Third valve port
17 Bypass duct
18 Front face
19 Shell surface section
20 First control edge
21 Second control edge
22 Bypass flow
23 Lubricant flow
24 Lubricant flow
25 Restoring spring
26 Stop
27 Control device
28 Bypass opening
29 Opening

The invention claimed is:

1. A vehicle transmission with at least one lubrication point, a power take-off, a lubricant tapping point for a power take-off module, and a lubrication system for supplying the at least one lubrication point and the lubricant tapping point with lubricant, the lubrication system comprising:
   a lubricant reservoir
   a main line section emerging from the lubricant reservoir;
   a first supply line section leading to the at least one lubrication point;
   a second supply line section leading to the lubricant tapping point;
   a return line section leading to the lubricant reservoir;
   a valve with a first valve port associated with the main line section, a second valve port associated with the lubricant tapping point, a third valve port associated with the return line section, and a bypass duct that extends between the first valve port and the second valve port, and
   the valve is configured to be switched, based on a pressure applied at the first valve port, between a first shift position in which, regardless of a bypass flow, a lubricant flow between the first valve port and the second valve port is blocked and a lubricant flow between the first valve port and the third valve port is also blocked, a second shift position in which, regardless of the bypass flow, the lubricant flow between the first valve port and the second valve port is enabled and the lubricant flow between the first valve port and the third valve port is blocked, and a third shift position in which, regardless of the bypass flow, the lubricant flow between the first valve port and the second valve port is enabled and the lubricant flow between the first valve port and the third valve port is also enabled.

2. The vehicle transmission according to claim 1, wherein the valve is configured to switch to the first shift position when the pressure at the first valve port is below a predetermined first pressure value, to switch to the second shift position when the pressure at the first valve port is higher than the predetermined first pressure value but lower than a predetermined second pressure value, and to switch to the third shift position when the pressure at the first valve port is higher than the predetermined second pressure value.

3. The vehicle transmission according to claim 2, wherein the predetermined first pressure value is between 1 bar and 1.5 bar.

4. The vehicle transmission according to claim 2, wherein the predetermined second pressure value exceeds the predetermined first pressure value by at most 0.5 bar.

5. The vehicle transmission according to claim 1, wherein the valve is in the form of a directional valve with a valve housing and a valve piston.

6. The vehicle transmission according to claim 5, wherein the valve piston comprises a first control edge configured for the optional blocking and release of a lubricant flow between the first valve port and the second valve port , and a second control edge configured for the optional blocking and release of a lubricant flow between the first valve port and the third valve port.

7. The vehicle transmission according to claim 1, wherein the lubrication system comprises a lubricant pump configured for delivering a lubricant pressure that acts at the first valve port.

8. A vehicle comprising the vehicle transmission according to claim 1.

9. A working machine arrangement comprising the vehicle according to claim 8 and a power take-off module connected to the power take-off of the vehicle transmission.

* * * * *